United States Patent
Sandrasekaran et al.

(10) Patent No.: US 12,203,516 B2
(45) Date of Patent: Jan. 21, 2025

(54) BRAKE DISC AND A VEHICLE

(71) Applicant: Volvo Truck Corporation, Gothenburg (SE)

(72) Inventors: Ramachandran Sandrasekaran, Karnataka (IN); Kent Augustsson, Bollebygd (SE); Marcel Palmgren, Torslanda (SE); Martin Petersson, Sävedalen (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/766,761

(22) PCT Filed: Oct. 14, 2019

(86) PCT No.: PCT/EP2019/077771
§ 371 (c)(1),
(2) Date: Apr. 6, 2022

(87) PCT Pub. No.: WO2021/073712
PCT Pub. Date: Apr. 22, 2021

(65) Prior Publication Data
US 2024/0093738 A1     Mar. 21, 2024

(51) Int. Cl.
*F16D 65/12* (2006.01)
*F16D 65/02* (2006.01)
*F16D 69/04* (2006.01)

(52) U.S. Cl.
CPC ...... *F16D 65/122* (2013.01); *F16D 2065/132* (2013.01); *F16D 2065/1324* (2013.01);
(Continued)

(58) Field of Classification Search
CPC ..................................................... F16D 65/122
(Continued)

(56) References Cited

U.S. PATENT DOCUMENTS

| 2,105,188 A | 1/1938 | Guy |
| 2,485,082 A | 10/1949 | Bachman |

(Continued)

FOREIGN PATENT DOCUMENTS

| CA | 1300524 C | 5/1992 |
| CN | 1607340 A | 4/2005 |

(Continued)

OTHER PUBLICATIONS

Intention to Grant for European Patent Application No. 19794898.7, mailed Jul. 13, 2023, 35 pages.

(Continued)

*Primary Examiner* — Thomas J Williams
(74) *Attorney, Agent, or Firm* — Withrow & Terranova, PLLC

(57) ABSTRACT

A brake disc configured to be connected to a vehicle axle and to be squeezed between brake pads, comprising a central disc body (30) having a first and a second side, wherein the second side faces in the opposite direction compared to the first side; a first and a second disc plate (36, 38), each disc plate having a wear surface for producing friction when a brake pad is pressed against the wear surface; wherein the disc plates are releasably secured to said first side and said second side, respectively, of said central disc body, so as to enable the first and second disc plates to be replaced by other disc plates; and an enveloping sleeve (50) releasably secured to an outer circumference of the central disc body so as to apply a radially inwardly directed pressure to the disc plates.

17 Claims, 7 Drawing Sheets

(52) U.S. Cl.
CPC ............... *F16D 2065/1392* (2013.01); *F16D 2069/0433* (2013.01)

(58) Field of Classification Search
USPC .................................................. 188/218 XL
See application file for complete search history.

(56) References Cited

U.S. PATENT DOCUMENTS

| | | | |
|---|---|---|---|
| 3,430,741 A | 3/1969 | Meredith | |
| 3,800,392 A * | 4/1974 | Cook ..................... | F16C 35/06 29/402.06 |
| 4,019,613 A * | 4/1977 | Harrison ............... | F16D 65/128 188/218 XL |
| 4,026,393 A | 5/1977 | Gebhardt et al. | |
| 4,132,294 A | 1/1979 | Poli | |
| 4,362,225 A | 12/1982 | Drott | |
| 4,593,431 A * | 6/1986 | Sandberg ................ | E05D 15/44 16/DIG. 40 |
| 4,613,021 A | 9/1986 | Lacombe et al. | |
| 5,101,940 A | 4/1992 | Mungo et al. | |
| 5,558,186 A | 9/1996 | Hyde et al. | |
| 5,769,185 A * | 6/1998 | Main ....................... | F16D 69/04 188/218 XL |
| 5,779,006 A | 7/1998 | Hyde et al. | |
| 8,881,873 B2 * | 11/2014 | Iwai ..................... | F16D 65/127 188/26 |
| 9,366,302 B1 | 6/2016 | Kirkpatrick | |
| 10,274,034 B2 | 4/2019 | Fiala et al. | |
| 2006/0016646 A1 | 1/2006 | Banks et al. | |
| 2010/0060024 A1 | 3/2010 | Flynn et al. | |
| 2017/0184164 A1 | 6/2017 | Bean et al. | |
| 2023/0141095 A1 | 5/2023 | Sandrasekaran et al. | |
| 2023/0193968 A1 | 6/2023 | Mohwinkel et al. | |
| 2024/0093738 A1* | 3/2024 | Sandrasekaran ...... | F16D 65/122 |
| 2024/0093739 A1* | 3/2024 | Sandrasekaran ...... | F16D 65/122 |

FOREIGN PATENT DOCUMENTS

| | | | |
|---|---|---|---|
| CN | 103987986 A | 8/2014 | |
| CN | 102852999 B | 8/2016 | |
| CN | 108869583 A | 11/2018 | |
| CN | 109236904 A | 1/2019 | |
| DE | 2615651 A1 | 10/1976 | |
| DE | 19842982 A1 | 4/2000 | |
| EP | 2009316 A1 | 12/2008 | |
| EP | 3428470 A1 | 1/2019 | |
| FR | 1354811 A | 3/1964 | |
| GB | 1492712 A | 11/1977 | |
| JP | 2009002375 A | 1/2009 | |
| KR | 101352498 B1 | 1/2014 | |
| KR | 20160142174 A | 12/2016 | |
| WO | 2012107033 A2 | 8/2012 | |

OTHER PUBLICATIONS

International Search Report and Written Opinion for International Patent Application No. PCT/EP2019/077771, mailed Jun. 8, 2020, 13 pages.
First Office Action for Chinese Patent Application No. 201980100979.0, mailed Mar. 18, 2024, 14 pages.
Non-Final Office Action for U.S. Appl. No. 17/766,757, mailed May 10, 2024, 9 pages.
Notice of Allowance for U.S. Appl. No. 17/766,757, mailed Oct. 15, 2024, 6 pages.
Non-Final Office Action for U.S. Appl. No. 17/766,763, mailed May 10, 2024, 7 pages.
First Office Action for Chinese Patent Application No. 201980100826.6, mailed Jan. 15, 2024, 11 pages.
Intention to Grant for European Patent Application No. 19794899.5, mailed Mar. 9, 2023, 36 pages.
International Search Report and Written Opinion for International Patent Application No. PCT/EP2019/077773, mailed Jun. 8, 2020, 14 pages.
International Preliminary Report on Patentability for International Patent Application No. PCT/EP2019/077773, mailed Sep. 24, 2020, 9 pages.
First Office Action for Chinese Patent Application No. 201980101291.4, mailed Mar. 18, 2024, 12 pages.
International Search Report and Written Opinion for International Patent Application No. PCT/EP2019/077767, mailed Jun. 2, 2020, 13 pages.
International Preliminary Report on Patentability for International Patent Application No. PCT/EP2019/077767, mailed Sep. 28, 2020, 12 pages.

* cited by examiner

BRAKE DISC AND A VEHICLE

This application is a 35 USC 371 national phase filing of International Application No. PCT/EP2019/077771, filed Oct. 14, 2019, the disclosure of which is incorporated herein by reference in its entirety.

TECHNICAL FIELD

The invention relates to a brake disc configured to be connected to a vehicle axle and to be squeezed between brake pads. The invention also relates to a vehicle comprising such a brake disc.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

Brake discs for vehicles are available in various forms. For instance, some brake discs have disc plates made of grey iron or other frictional material. Some discs plates are provided with a metallic or non-metallic (such as ceramic) coating. The disc plates may be attached to a wheel end hub in various ways. For instance, the disc plates may be riveted, adhesively bonded or thermally sprayed to the wheel end hub. When the disc plates have worn out, it is often necessary to replace the entire brake disc.

US 2017/184164 discloses a brake rotor assembly which has a structural part and friction surface parts which are joined together. The friction surface parts can for example be fixedly attached to the structural part by means welding or adhesive. Other alternatives which appear to provide the possibility of less permanent fixation are screws or bolts. Although it may be beneficial for the replacement of disc plates to provide separate friction surface parts that are screwed to, and unscrewed from, a structural part (as this would, only require replacement of the friction surface parts), this too has disadvantages. The screws and bolts will be subject to wear as brake pads are clamped to the disc plates during braking of the vehicle. Thus, not only may the strength of the screw and bolt become reduced, but wear of the heads of the screws or bolts, may result in quite a challenge when you want to unscrew the screws or bolts for replacing the disc plates. Furthermore, the presence of screws of bolts will also add to the (possibly uneven) wear of the brake pads. Thus, although US 2017/184164 is beneficial in some respects, there are still improvements to be made.

SUMMARY

An object of the invention is to at least partly mitigate the drawbacks of the prior art. This and other objects, which will become apparent in the following, are accomplished by the accompanying independent claims.

According to a first aspect of the invention, the object is achieved by a brake disc configured to be connected to a vehicle axle and to be squeezed between brake pads, comprising:

a central disc body having a first side and a second side, wherein the second side faces in the opposite direction compared to the first side, a first disc plate and a second disc plate, each disc plate having a wear surface for producing friction when a brake pad is pressed against the wear surface, wherein the first and the second disc plates are releasably secured to said first side and said second side, respectively, of said central disc body, so as to enable the first and second disc plates to be replaced by other disc plates, wherein an enveloping sleeve releasably secured to an outer circumference of the central disc body so as to apply a radially inwardly directed pressure to the first and second disc plates.

By the provision of an enveloping sleeve, the disc plates can be secured to the central disc body, without using screws or bolts extending through the wear surface of the disc plates. Thus, heads of screw or bolts which causes extra wear on the brake pads and which themselves become worn and deteriorated are avoided by instead providing the enveloping sleeve in accordance with the present invention. Thus, the inventors of the present invention have realized that replaceable disc plates are possible to have without the drawbacks of the prior art by instead of holding the disc plates at their wear surface, you apply a holding force at their outer peripheral surface. By simply removing the enveloping sleeve (which may, for instance, be attached to the outer circumference of the central disc body by means of snap fit, screws, bolts or other suitable means), worn disc plates may conveniently be replaced without needing to replace the entire brake disc arrangement, and thereafter the enveloping sleeve may be re-attached.

According to at least one exemplary embodiment, the enveloping sleeve covers the first and the second disc plates. In some exemplary embodiments the enveloping sleeve may cover the entire circumferential surface of the respective disc plate (i.e. the whole width/thickness of the disc plate), while in other exemplary embodiments the enveloping sleeve covers part of the circumferential surface (for example a part of the width/thickness of the disc plate which is closest to the central disc body). By covering the first and second disc plates, a simple and efficient solution is provided for holding the disc plates. However, it should be understood that in other exemplary embodiments, it may be conceivable to apply the holding force indirectly from the enveloping sleeve only covering the central disc body, via some other component or components to the disc plates.

In line with the previous discussions, according to at least some exemplary embodiments, the width of the enveloping sleeve is greater than the width of the outer circumference of the central disc body. Thus, the enveloping sleeve may suitably extend at least partly over the disc plates.

According to at least one exemplary embodiment, the enveloping sleeve forms a circle around the outer circumference of the central disc body. Although it is conceivable to, in at least some exemplary embodiments, have an enveloping sleeve which does not necessarily present a complete circle, a more uniform force distribution and retention capacity may be achieved if the enveloping sleeve forms a complete circle.

According to at least one exemplary embodiment, the brake disc has a geometrical centre axis, wherein the enveloping sleeve comprises a circular central portion flanked on either side by two edge portions extending from the central portion to a respective edge, wherein each one of the edge portions has a mating surface for mating with an outer periphery of the first and second disc plates, respectively, wherein each one of the mating surfaces are inclined relative to the geometrical centre axis for counteracting axial movement of the disc plates relative to the central disc body. This is advantageous since, in addition to the pressure provided by the enveloping sleeve, the inclination forms an extra axial stop. Again, axial movement of the disc plates are prevented without using bolts or screws inserted through the wear surfaces of the disc plates. Of course, instead of or in addition to said inclination, other means are also conceivable for counteracting axial movement of the disc plate relative to the central disc body. For instance, in some exemplary embodiments, the disc body facing surface of the disc plates and the central disc body may be provided with mutually cooperating engagement means. In some exemplary embodiments, the enveloping sleeve (or a component attached to the enveloping sleeve) may be provided with fixation means (such as screws or rivets) which may be inserted through the outer circumference of central disc body and the disc plates in order to axially fixate the disc plates relative to the central disc body.

According to at least one exemplary embodiment, for each one of said inclined mating surfaces, the distance between the geometrical centre axis and the mating surface is relatively larger adjacent to the central portion of the enveloping sleeve and relatively smaller adjacent to the respective edge of the enveloping sleeve. Thus, in a cross-section the mating surfaces may form an interface which resembles a tent (or bracket) covering the central disc body. It should be understood that that the inclined mating surfaces, do not necessarily have to have a straight inclination; it may for example be conceivable to have an inclination which follows a curved extension.

According to at least one exemplary embodiment, said outer periphery of the disc plate extends from the wear surface to an oppositely located disc body facing surface, wherein said outer periphery tapers in a direction from the disc body facing surface towards the wear surface, wherein said mating surfaces of the enveloping sleeve has the same angle of taper as said outer periphery of the first and second disc plates, respectively. Any appropriate angle of inclination may be chosen, suitably between 0° and 90°. It should be noted that although it is advantageous to have the same or substantially angle of taper on the mating surfaces as on said outer periphery of the first and second disc plates, respectively (thus making use of a large contact interface), in some exemplary embodiments it is conceivable to have a slightly different angle of taper between the mating surfaces and the outer peripheries of the first and second disc plates (for example to achieve a slight wedging effect).

According to at least some exemplary embodiments, each one of the first and second disc plates has an inner periphery extending from the wear surface to the disc body facing surface, wherein the inner periphery is tapered, wherein the central disc body has a mating ledge inclined with the same angle as said taper of the inner periphery, and adapted to receive said inner periphery of the disc plate. By the provision of a taper at the inner periphery (in addition to or instead of at the outer periphery) an extra support in the axial direction is provided.

According to at least one exemplary embodiment, the thickness of each one of the edge portions of the enveloping sleeve increases from the central portion towards the respective edge. This is advantageous from a manufacturing perspective while providing good support to the disc plates.

According to at least one exemplary embodiment the enveloping sleeve is secured by fastening means to the central disc body. There may be a number of different option for fastening means. In some exemplary embodiments, the fastening means is or may comprise bolts, screws, rivets. In some exemplary embodiments, the fastening means may comprise mutually cooperating snap fit portions on the enveloping sleeve and the central disc body, respectively. Suitably, the fastening means are such that they are easily releasable (without compromising there fastening strength) so as to allow a simple removable of the enveloping sleeve for replacement of disc plates when these have become worn.

According to at least one exemplary embodiment, the brake disc further comprises a connecting member, such as a pin, for preventing rotation of the disc plates relative to the central disc body, the connecting member extending from the first disc plate, through a passage in the central disc body, to the second disc plate, wherein the connecting member extends into each one of the first and second disc plates. The connecting member may suitably be resilient (compressible and expandable) in the radial direction such that it presses against the passage walls and is firmly kept in place. The connecting member should suitably not extend all the way to the wear surface as that would risk similar problems as with the prior art in which screws or bolts were applied at the wear surface of the disc plates. Suitably, the connecting member extends just short of the thickness at which the disc plate would be replaced due to wearing. For instance, if the disc plate is intended to be replaced when half its thickness have worn off, then the connecting member would be configured to extend from the central disc body into the disc plate no more than half the thickness of the disc plate.

According to at least one exemplary embodiment each one of the first and second disc plates comprises a cavity for housing a respective end of the connecting member. The cavity may suitably be a through-hole for facilitating the insertion of the connecting member and later on the removal of the connecting member when the time has come to replace the disc plates.

According to at least one exemplary embodiment, said passage through the central disc body has a cross-sectional area which substantially corresponds to the cross-sectional area of the connecting member. Suitably, if said connecting member is resilient (compressible/expandable) the cross-sectional area of the connecting member may in a relaxed state be larger than the cross-sectional area of the said passage. In such case, the connecting member is compressed when inserted through the passage, and will then strive to resume its initial relaxed state, thus expanding against the passage walls.

According to at least one exemplary embodiment, said connecting member is a first connecting member and said passage is a first passage, wherein the brake disc further comprises at least a second connecting member extending from the first disc plate, through at least a second passage in the central disc body, to the second disc plate. Thus, there may be provided a plurality of connecting members, such as pins, for example resilient pins, which may be provided in respective passages to increase the strength of preventing the first and second disc plates to rotate relative to the central disc body.

Said second connecting member may suitably be connected to the first and second disc plates and to the central disc body at a shorter radial distance from the geometrical centre axis of the brake disc than the first connecting member. The plurality of connecting members may suitably be distributed in both the radial direction and the circumferential direction, or in only one of said directions. According to at least one exemplary embodiment, said first connecting member is one of a plurality of first connecting members and said first passage is one of a plurality of first passages, wherein each one of said plurality of first connecting members extends from the first disc plate, through a respective first passage in the central disc body, to the second disc plate, wherein said plurality of first connecting members are distributed along a first geometrical circle. According to at least one exemplary embodiment, said second connecting member is one of a plurality of second connecting members and said second passage is one of a plurality of second passages, wherein each one of said plurality of second connecting members extends from the first disc plate, through a respective second passage in the central disc body, to the second disc plate, wherein said plurality of second connecting members are distributed along a second geometrical circle, wherein the second geometrical circle is encircled by the first geometrical circle. According to at least one exemplary embodiment, each one of said plurality of first connecting members along the first geometrical circle is paired with a corresponding one of said plurality of second connecting members along the second geometrical circle, such that the first and second connecting members of each pair are located on a common radius. A symmetric distribution may be advantageous for the sake of good stability of the assembly.

According to at least one exemplary embodiment, the central disc body is provided with a plurality of passages for receiving a respective connecting member, wherein each one of the first and second disc plate has a plurality of holes, wherein the distribution pattern of said plurality of holes corresponds to the distribution pattern of said plurality of passages.

It should be understood that the above exemplified one or more connecting members for preventing rotation of the disc plates relative to the central disc body, are just one of several conceivable examples to achieve that effect. In other exemplary embodiments, the prevention against rotation may be achieved by mutually cooperative structures, such as for instance one or more protrusions and/or recesses in the central brake disc which are configured to engage with matching recesses and/or protrusions, respectively at the disc body facing side of the each disc plate.

According to at least one exemplary embodiment, the brake disc may comprise cooling channels for allowing circulation of air there through. Such cooling channels may, for instance, be provided in the central disc body. Alternatively, or additionally, cooling channels may be provided between the central disc body and the first and second disc plates.

Although the enveloping sleeve may advantageously be used for holding a complete disc plate, in some exemplary embodiments, it would be conceivable that each one of the first disc plate and the second disc plate comprises two or more disc plate segments which are separable from one another, wherein said wear surface is provided on each disc plate segment. In such case, the total number of connecting members is suitably at least equal to the number of disc plate segments for one of the first and second disc plates. Thus, according to at least some exemplary embodiments, each one of said first and second disc plates comprises two or more disc plate segments. Using a plurality of separate disc plate segments which together make up a complete disc plate when mounted to the central disc body may facilitate mounting the disc plates to central disc body, in particular when the disc body is provided with an inclined ledge for receiving the disc plates. However, it should be understood that a segmented disc plate may also be used in connection with a non-inclined ledge.

According to at least some exemplary embodiments, the enveloping sleeve comprises two or more enveloping sleeve segments. Thus, the separate enveloping sleeve segments together make up a complete enveloping sleeve when mounted to the central disc body. Using a segmented enveloping sleeve may be advantageous for facilitating the mounting of the enveloping sleeve, in particular if the enveloping sleeve and the outer peripheries of the disc plates have inclined surfaces. However, it should be understood that a segmented enveloping sleeve may also be used in connection with non-inclined surfaces.

According to a second aspect of the invention, the object is achieve by a vehicle comprising a brake disc according to the first aspect, including any embodiments thereof. The advantages of the second aspect are largely analogous with the advantages of the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
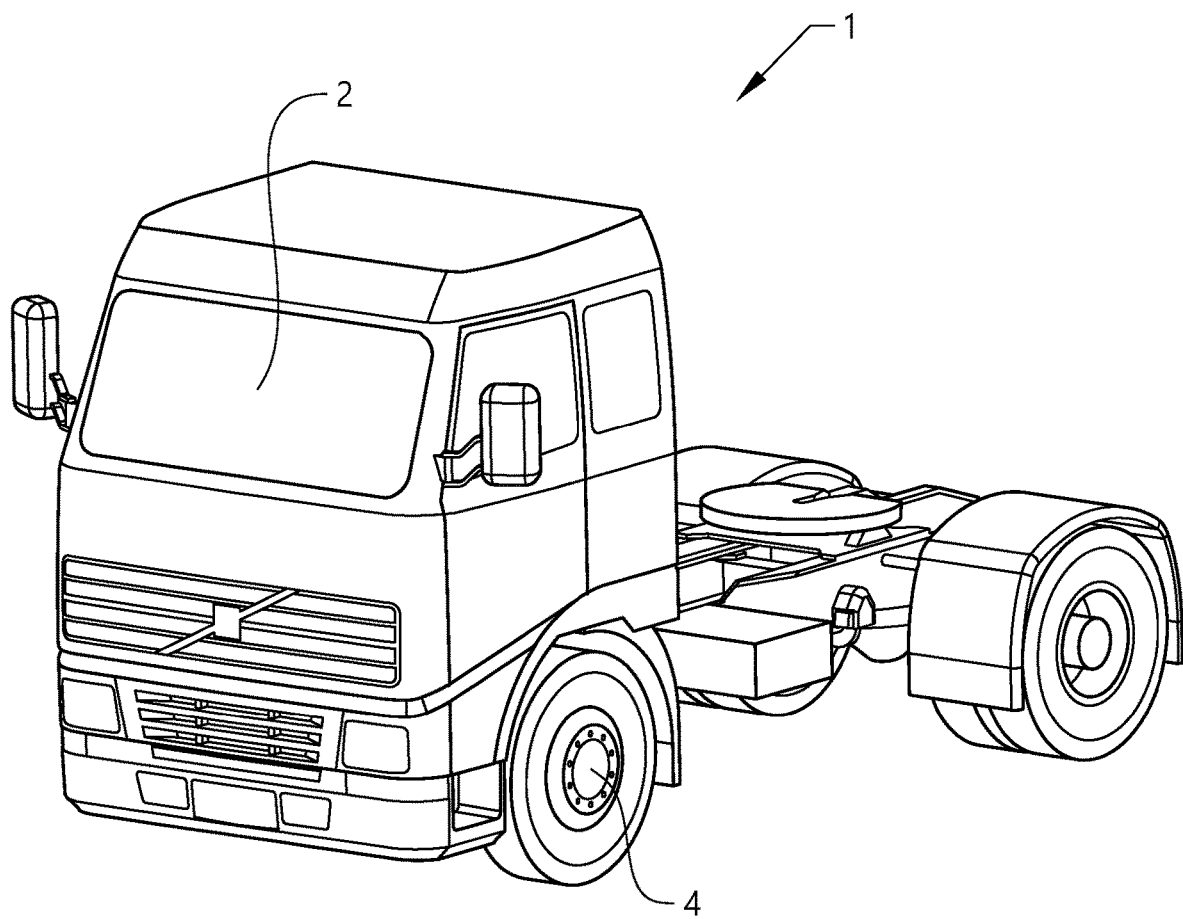
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle) comprises a cab 2 in which a driver may operate the vehicle 1. The vehicle 1 comprises a number of road wheels 4, herein illustrated as two pairs of wheels, however in other embodiments there may be a different number of wheels, such as three pairs, four pairs or more. In the cab 2 a driver may press a brake pedal with his/her foot in order to activate the brake or brakes. Activation of the brake causes brake pads to be pressed against an inventive brake disc (not illustrated in FIG. 1) connected via a wheel end hub to an axle that rotates the road wheels 4.

Figure 2:
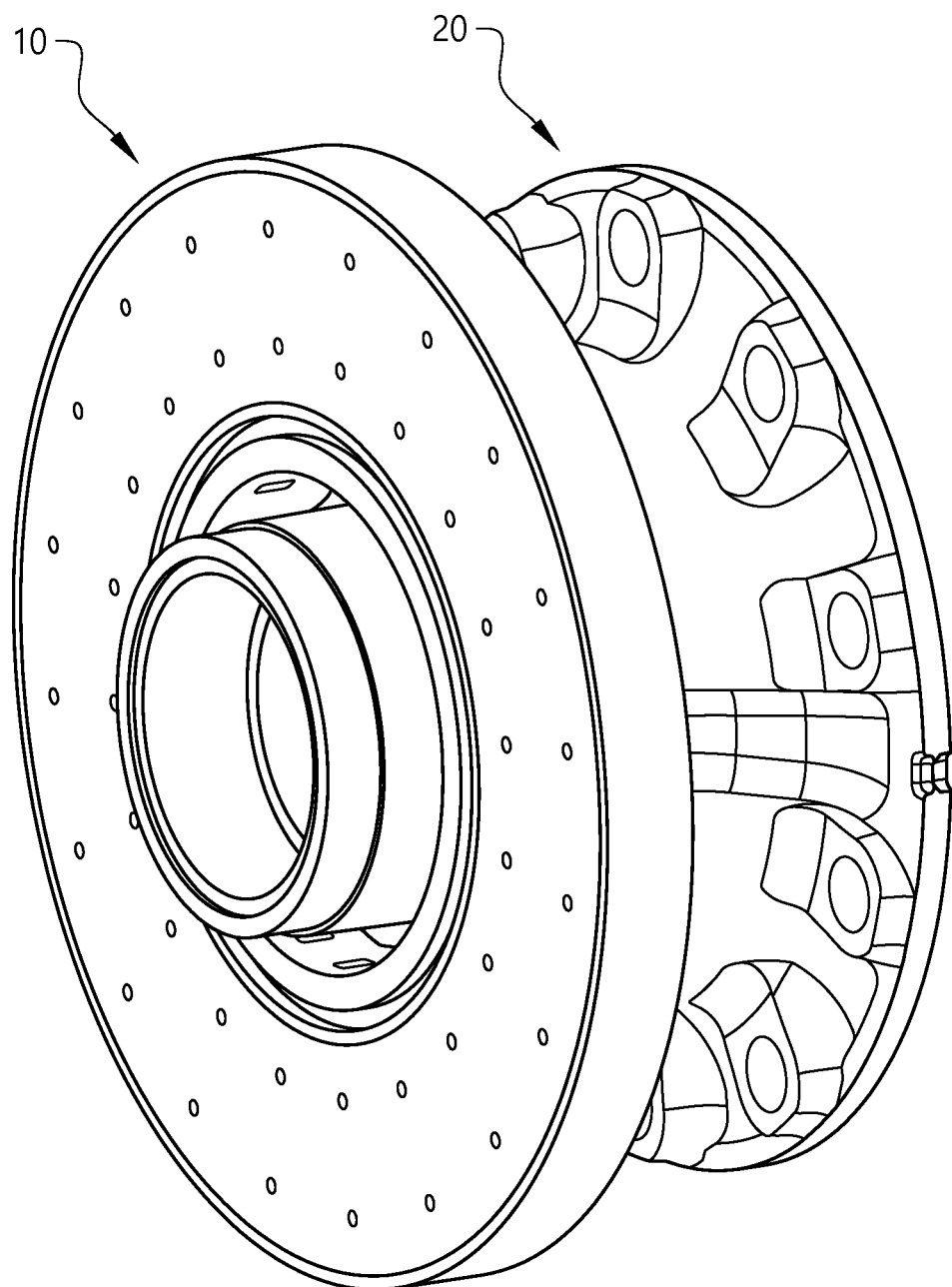
FIG. 2 illustrates a brake disc according to at least one exemplary embodiment, mounted on a wheel end hub.
Figure 3:
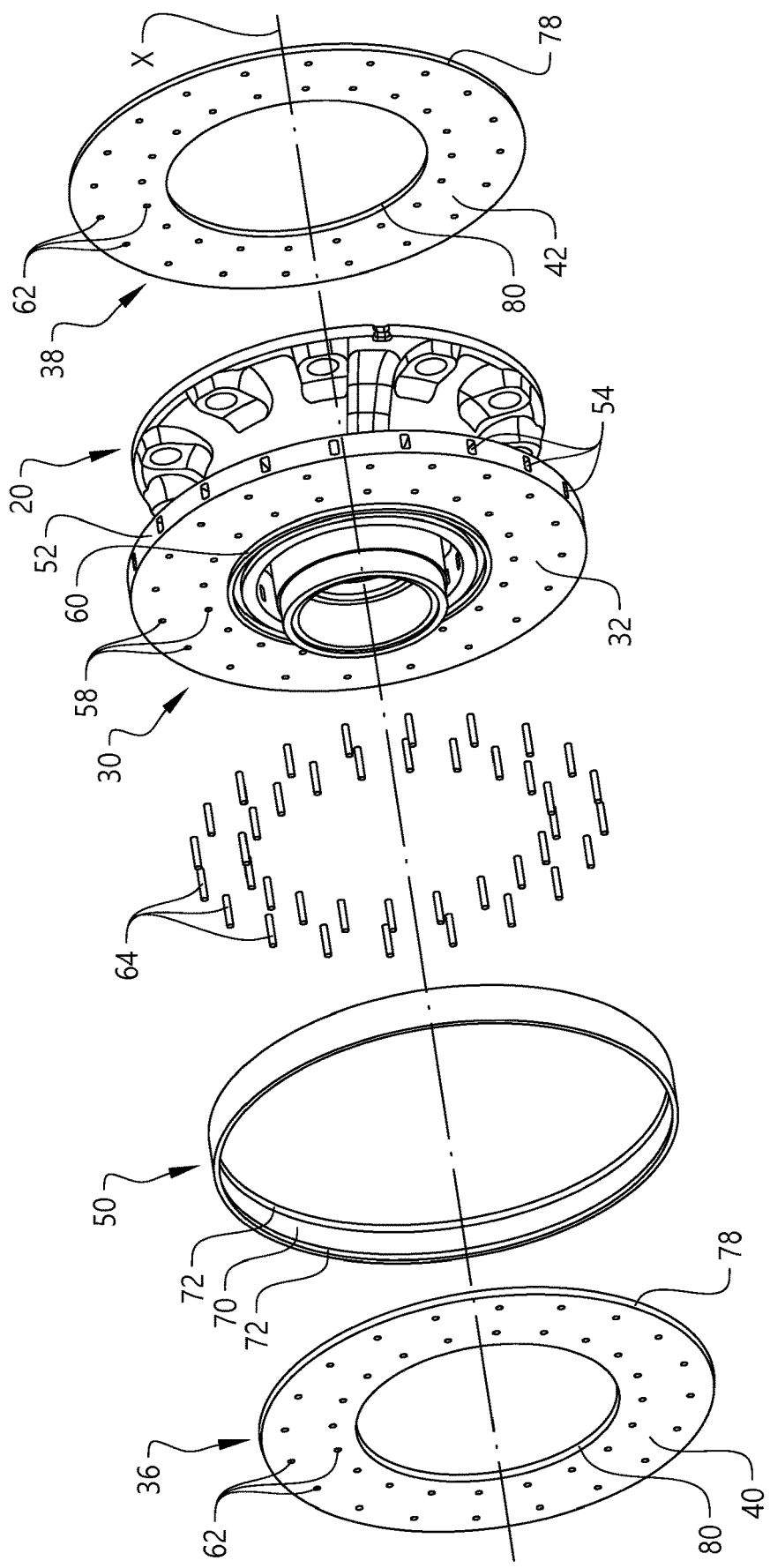
FIG. 3 illustrates an exploded view of the brake disc in FIG. 2.
Figure 4:
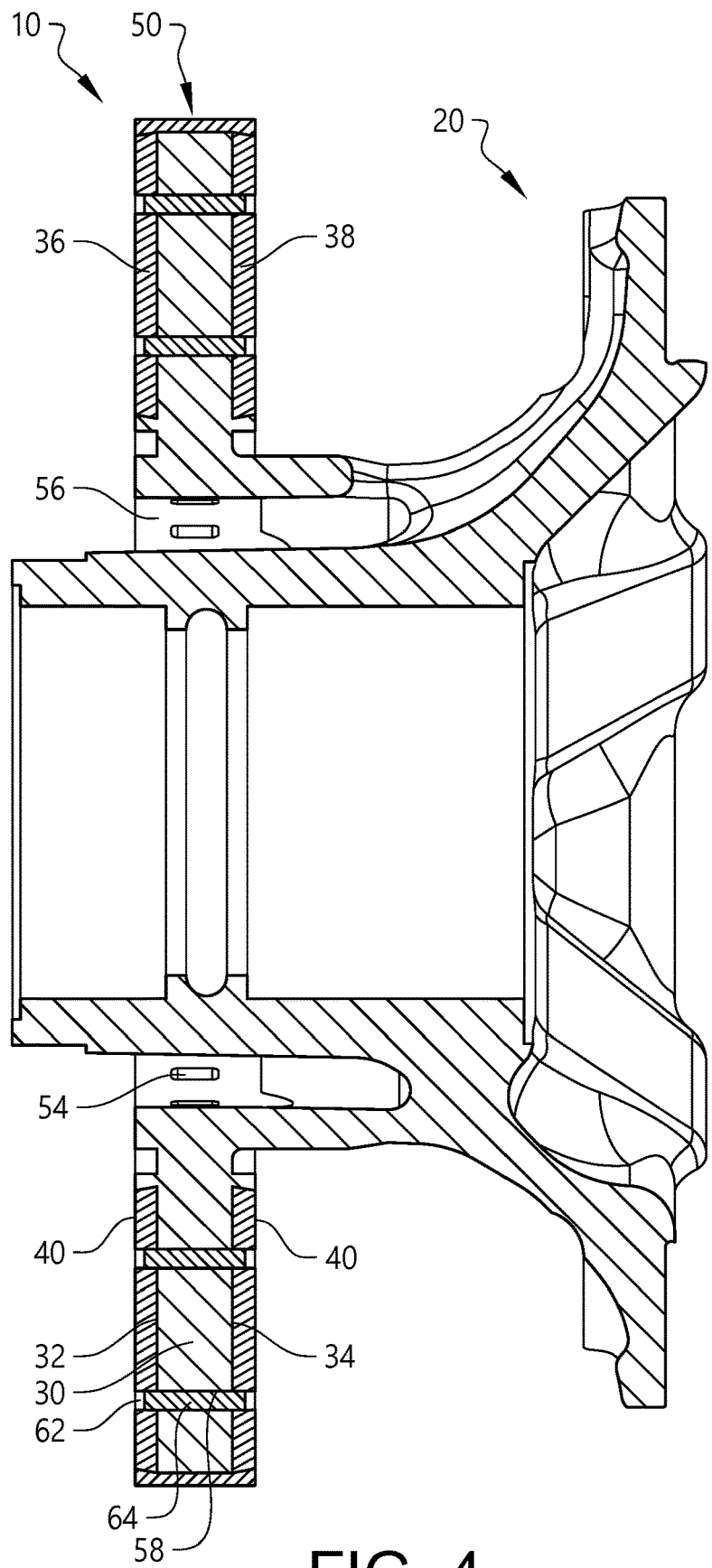
FIG. 4 illustrates a cross-sectional view of the brake disc in FIG. 2.
Figure 5:
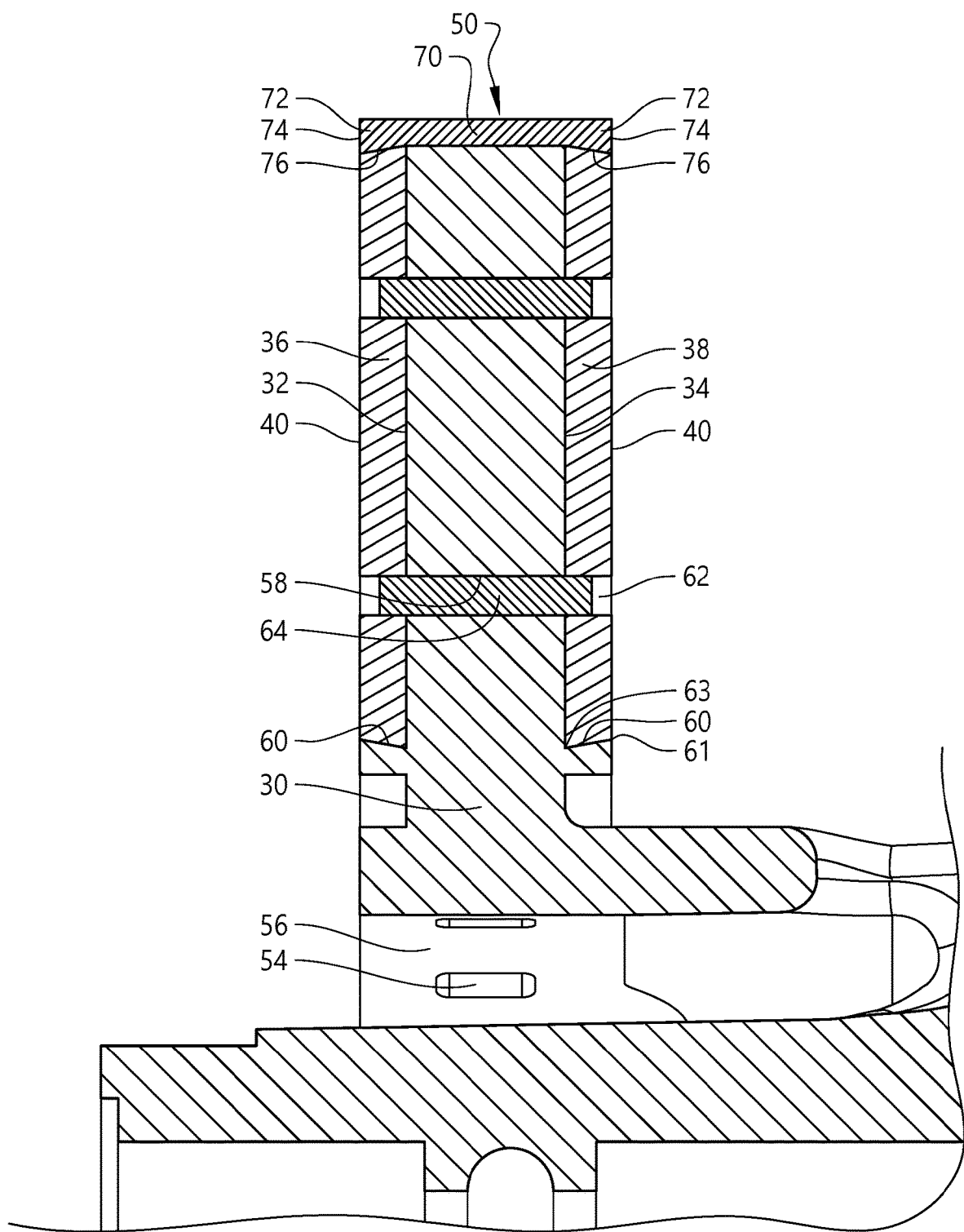
FIG. 5 is an enlarged view of part of FIG. 4.

FIG. 2 illustrates a brake disc 10 according to at least one exemplary embodiment, mounted on a wheel end hub 20. FIG. 3 illustrates an exploded view of the brake disc 10 in FIG. 2. FIG. 4 illustrates a cross-sectional view of the brake disc 10 in FIG. 2. FIG. 5 is an enlarged view of FIG. 4. The brake disc 10 is configured to be connected via the wheel end hub 20 to a vehicle axle (not illustrated) and to be squeezed between brake pads (not illustrated).

With reference to FIGS. 2-5 and, for explanatory reasons in particular with reference to the exploded view of FIG. 3, the brake disc comprises a central disc body 30 having a first side 32 and a second side 34 (see FIGS. 4 and 5). The second side 34 faces in the opposite direction compared to the first side 32. The brake disc 10 comprises a first disc plate 36 and a second disc plate 38, each disc plate 36, 38 having a wear surface 40 for producing friction when a brake pad is pressed against the wear surface 40. The wear surfaces 40 face away from the central disc body 30. Each disc plate also has an oppositely facing, i.e. a disc body facing surface 42. In the exploded view of FIG. 3, the wear surface 40 of the first disc plate 36 and the disc body facing surface 42 of the second disc plate 38 are visible.

The first disc plate 36 is releasably secured to the first side 32 of the central disc body 30 and the second disc plates 38 is releasably secured to the second side 34 of the central disc body 30. When the first and second disc plates 36, 38 have been sufficiently worn out, they may easily be replaced with new disc plates, without needing to dismount the central disc body 30 from the wheel end hub 20. An enveloping sleeve 50 is releasably secured to an outer circumference 52 (see FIG. 3) of the central disc body 30 so as to apply a radially inwardly directed pressure to the first and second disc plates 36, 38.

The central disc body 30 is substantially circular and ring-shaped having a central opening through which the wheel end hub 20 may protrude. The central disc body 30 will thus be supported by the wheel end hub 20, while the removable disc plates 36, 38 are or will be mounted to the central disc body 30. The central disc body 30 may suitably be provided with cooling channels to allow air to circulate and cool the brake disc 10. In FIG. 3 cooling channel apertures 54 are visible on the radially outer circumference 52 of the central disc body 30. Said radially outer circumference 52 may also be referred to as the radially outer periphery of the central disc body 30. In this connection, it should be noted that the brake disc 10 has a geometrical centre axis x around which it rotates with the wheel axle. The geometrical centre axis x may thus also be referred to as a rotational axis. Radial directions are thus directions running perpendicularly away from the geometrical centre axis x. Circumferential directions run around the geometrical centre axis x. Axial directions extend along or in parallel with the geometrical centre axis x. In the cross-sectional view of FIG. 4, cooling channel apertures 54 are visible at the radially inner periphery 56 of the central disc body 30.

As best seen in FIG. 3, FIG. 4 and FIG. 5 the central disc body 30 may be provided with a plurality of passages 58 in the form of through holes which extend all the way from the first side 32 of the central disc body 30 to the second side 34 of the central disc body 30. The function of the passages 58 will be explained further down in this description. As can be seen in FIG. 3, the plurality of passages 58 are distributed along two concentric imaginary circles, and are arranged in pairs along radii in different radial directions from the geometrical centre axis. Thus, each passage 58 in the inner imaginary circle is paired along a radius from the geometrical centre axis with a passage 58 in the outer imaginary circle. It should be noted that in other embodiments the passages 58 may be distributed differently and need not be paired or distributed along imaginary circles. It should furthermore be noted that although a plurality of passages 58 are illustrated in the exemplary embodiments of the drawings, in other embodiments the number of such passages may be fewer, for example just one passage or even no passage at all.

The central disc body 30 may on each one of the first and second sides 32, 34 have an annular ledge 60 near its inner periphery 56 at the central hole, for supporting the first and second disc plates 36, 38, respectively (see FIG. 3 and FIG. 5). The two ledges 60 may be referred to as first and second ledges 60 for receiving the first and second disc plates 36, 38, respectively.

The first and second disc plates 36, 38 are also ring-shaped and thus the wheel end hub will extend through the central hole of the first and second disc plates 36, 38 as well. The first and second disc plates 36, 38 may be made of any suitable friction material (metallic, ceramic, etc.) and/or may be provided with a coating surface providing appropriate frictional properties. As can be seen in FIG. 3, the first and second disc plates 36, 38 may be provided with a plurality of holes 62 having a distribution pattern which corresponds to the distribution pattern of the plurality of passages 58.

FIG. 3 illustrates a plurality of connecting members 64 which are configured to be inserted into said passages 58 of the central disc body 30, each connecting member 64 fitting into one of said passages 58. As can be seen in FIG. 4 and FIG. 5, the length of the connecting members 64 may be such that they extend partly into the holes 62 of the first and second disc plates 36, 38, but preferably not to the wear surface 40 of the disc plates 36, 38. Suitably, the length of the connecting members 64 is shorter than the acceptable wear thickness of the disc plates 36, 38. Put differently, if the disc plates 36, 38 are envisaged to be replaced when they have worn down to a certain reduced thickness compared to their initial thickness, at such reduced thickness the connecting members 64 should still be short from the worn surface. The function of the connecting members 64 is to prevent relative rotation between the disc plates 36, 38 and the central disc body 30.

In the illustrated embodiments, a first plurality of connecting members 64 extend in a first plurality of passages 58 which are distributed along an imaginary outer circle, and a second plurality of connecting members 64 extend in a second plurality of passages 58 which are distributed along an imaginary inner circle. Other patterns are of course also conceivable.

The connecting members 64, which are herein illustrated as pins, may suitably be resilient in the radial direction. For instance, they may be compressed when inserted into the first and second disc plates 36, 38 and central disc body 30, and then expand so as to provide a tight fit with the walls defining the passages 58 in the central disc body 30. In some exemplary embodiments, said passages 58 through the central disc body 30 has a cross-sectional area which substantially corresponds to the cross-sectional area of the connecting members 64.

It should be understood that the disc plates do not necessarily need to have through holes 62 for accommodating the ends of the connecting members 64, it would also be conceivable to have blind bores extending from the disc body facing surface 42. Thus, in a general sense, each one of the first and second disc plates 36, 38 may comprise one or more cavities for housing a respective end of the one or more connecting members 64, regardless of the cavities being in the form of blind bores or through holes.

As can be seen in the drawings, in the illustrated exemplary embodiments, the width of the enveloping sleeve 50 is greater than the width of the outer circumference 52 of the central disc body 30. Suitably, as seen in the drawings, the enveloping sleeve 50 covers the first and the second disc plates 36, 38, i.e. its width substantially corresponds to the total width (or thickness) of the radially outer peripheries of the disc plates 36, 38 and the central disc body 30. However, in other exemplary embodiments, the enveloping sleeve 50 may have a smaller width and only partly covering the width of the disc plates 36, 38. In still other exemplary embodiments, the enveloping sleeve 50 may have an even smaller width wherein it may provide a force onto the disc plates 36, 38 via one or more other components which at least partly cover the outer peripheries of the disc plates 36, 38.

The enveloping sleeve 50 has been illustrated as forming a complete circle around the outer circumference of the central disc body (and around the disc plates), although other configurations are conceivable. As best seen in FIG. 3 and FIG. 5, the enveloping sleeve 50 has a circular central portion 70 flanked on either side by two edge portions 72 extending from the central portion 70 to a respective edge 74. Each one of the edge portions 72 has a mating surface 76 for mating with the outer periphery 78 of the first and second disc plates 36, 38, respectively (outer periphery 78 is indicated in FIG. 3). Each one of the mating surfaces 76 are inclined relative to the geometrical centre axis for counteracting axial movement of the disc plates 36, 38 relative to the central disc body 30. The angle of inclination may for instance be 5°-80° relative to the geometrical centre axis, for instance 10°-50°, such as 15°-30°.

In the illustrated embodiments, the thickness of each one of the edge portions 72 of the enveloping sleeve 50 increases from the central portion 70 towards the respective edge 74.

The inclination of the mating surfaces 76 is such that it slopes towards the geometrical centre axis as it extends away from the central disc body 30. Thus, for each one of said mating surfaces 76, the distance between the geometrical centre axis and the mating surface 76 is relatively larger adjacent to the central portion 70 of the enveloping sleeve 50 and relatively smaller adjacent to the respective edge 74 of the enveloping sleeve 50.

In a corresponding manner, the outer periphery 78 of each disc plate 36, 38 (which outer periphery 78 extends from the wear surface 40 to an oppositely located disc body facing surface 42) tapers in a direction from the disc body facing surface 42 towards the wear surface 40, wherein said mating surfaces 76 of the enveloping sleeve 50 has the same angle of taper as said outer periphery 78 of the first and second disc plates 36, 37, respectively.

Each one of the first and second disc plates 36, 38 has an inner periphery 80 (see FIG. 3) extending from the wear surface 40 to the disc body facing surface 42. The inner periphery 80 may be tapered, and suitably also the mating ledge 60 (see FIG. 5) of the central disc body 30 is inclined with the same angle as said taper of the inner periphery 80 of the disc plates 36, 38. The ledge 60 on each side is thus adapted to receive said inner periphery 80 of a respective one of the disc plates 36, 38. The ledge 60 comprises a free end 61 and a connected end 63. As illustrated in FIG. 5, the ledge 60 may suitably be inclined such that the distance between its free end 61 and the geometrical centre axis is greater than the distance between its connected end 63 and the geometrical centre axis.

The enveloping sleeve 50 may be secured by fastening means to the central disc body. For instance, as illustrated in the exemplary embodiment of FIG. 6, the fastening means 82 may be or may comprise bolts, screws of rivets, which may be loosened when the enveloping sleeve is to be removed so as to allow replacement of worn disc plates. However, in other exemplary embodiments, the fastening means may not be visible from the outside, such as for instance in the form of mutually cooperating snap fit portions on the enveloping sleeve and the central disc body, respectively (this may for instance be the case in FIG. 2). In other exemplary embodiments, there is no need for any particular fastening means, the enveloping sleeve my form a very tight fit with the central disc body and the disc plates, for instance providing a radially inward pressure of the disc plates towards an inclined ledge (such as the above discussed ledge 60) to counteract axial movement of the disc plates relative to the central disc body. Thus, it should be understood that the enveloping sleeve provides for numerous possibilities, alternatives and embodiments for releasably securing the disc plates to the central disc body, which do not have the drawbacks of the prior art screws applied through the wear surface of the disc plates.

Figure 6:
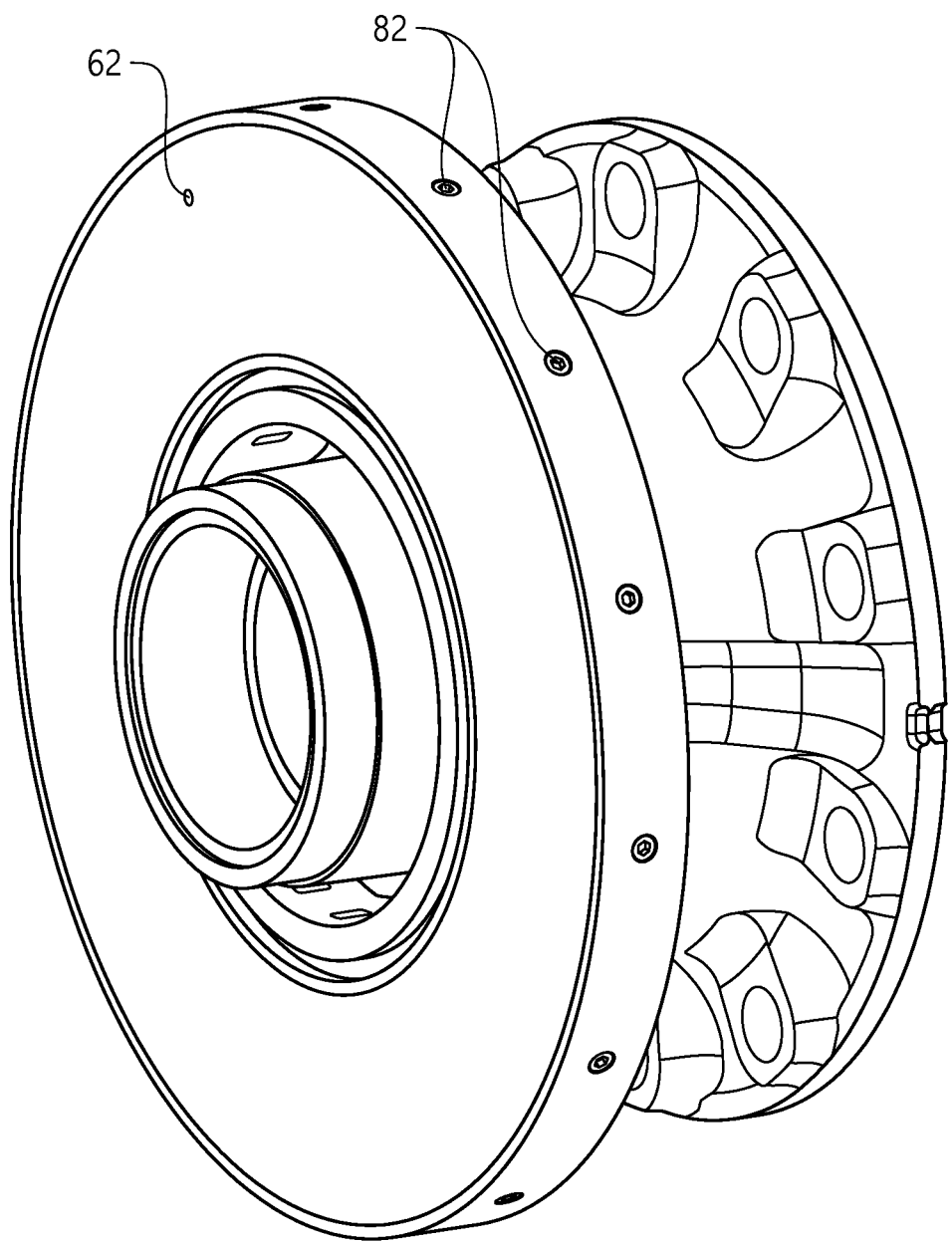
FIG. 6 illustrates a brake disc according to at least another exemplary embodiment, mounted on a wheel end hub.

As also illustrated in the exemplary embodiment of FIG. 6, the number of connecting members, passages and holes may be different in different embodiments. In FIG. 6, for instance, only one hole 62 is shown for inserting a single connecting member into one passage of the central disc body. It should thus be understood that features from any one of the herein described embodiments, whether discussed under the heading "Summary" or under the heading "Detailed Description of Example Embodiments of the Invention", may as long as they are compatible, be freely adapted to and implemented in any other one of the exemplary embodiments. For instance, the fastening means 82 in the exemplary embodiment of FIG. 6 may be implemented for the brake disc 10 in the exemplary embodiment of FIG. 2.

Figure 7:
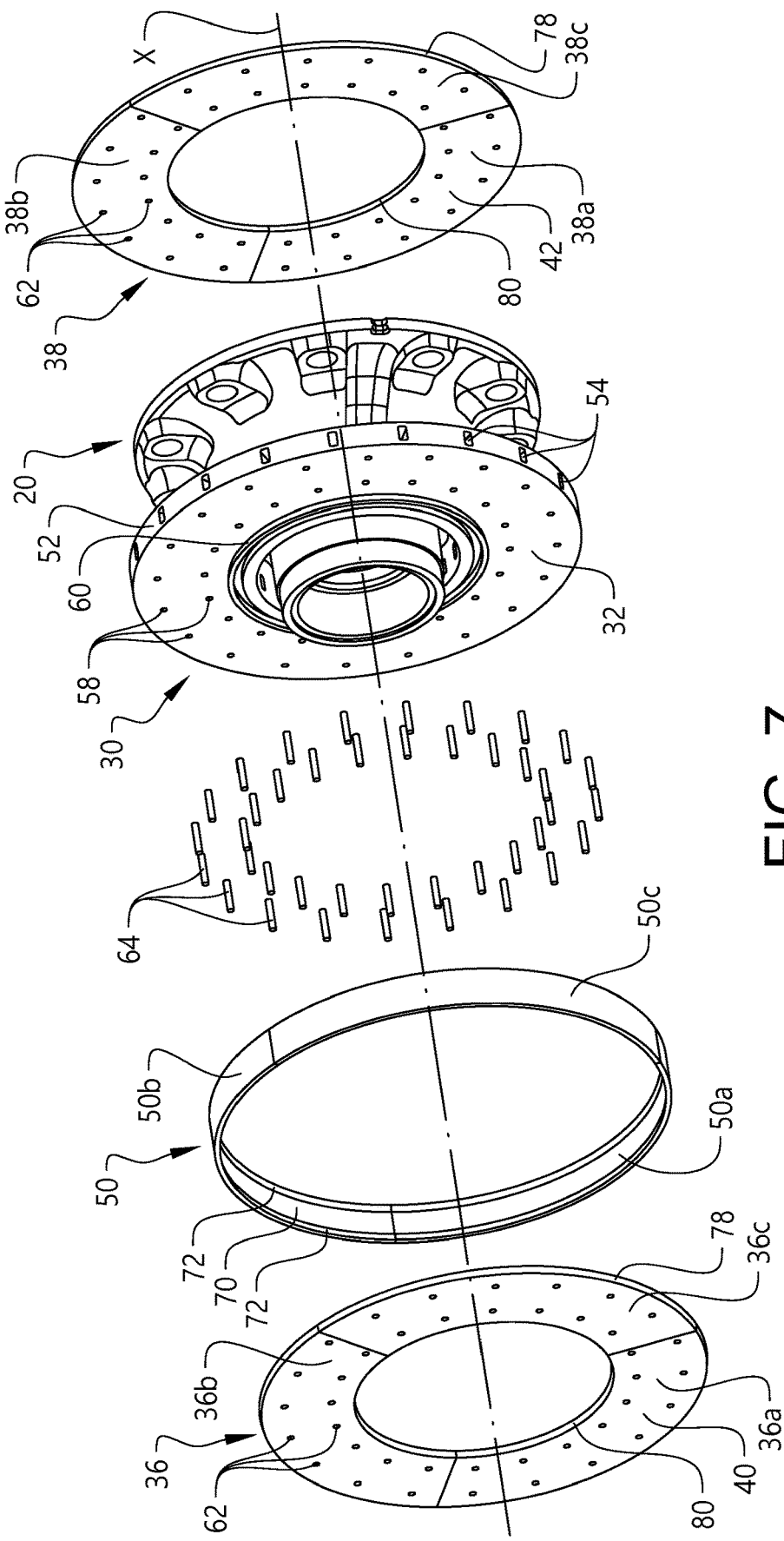
FIG. 7 illustrates an exploded view of a brake disc according to at least a further exemplary embodiment.

FIG. 7 illustrates an exploded view of a brake disc according to at least a further exemplary embodiment. This embodiment has most features in common with the exemplary embodiment of FIG. 3, and therefore, common features are represented by the same reference numerals.

In the exemplary embodiment of FIG. 7 the first disc plate 36 is made up by three separate disc plate segments 36a, 36b, 36c, which may be individually mounted to the central disc body 30. Once mounted, they make up the complete first disc plate 36. Similarly the second disc plate 38 is made up by three separate disc plate segments 38a, 38b, 38c, which may be individually mounted to the central disc body 30. Using a plurality of disc plate segments (i.e. two or more disc plate segments) to make up a complete disc plate may facilitate the mounting procedure, in particular if the disc plate is to be fitted to an inclined ledge 60 of the central disc body 30.

FIG. 7 also illustrates a segmented enveloping sleeve 50. The enveloping sleeve 50 is made up by three separate enveloping sleeve segments 50a, 50b, 50c, which may be individually mounted to the outer circumference 52 of the central disc body 30. Once mounted, they make up the complete enveloping sleeve 50. Using a plurality of enveloping sleeve segments (i.e. two or more enveloping sleeve segments) to make up a complete enveloping sleeve may facilitate the mounting procedure, in particular if the enveloping sleeve 50 has tapered edges 72 which mate with the outer periphery 78 of the disc plates 36, 38 (which may have a corresponding taper).

It should be understood that the segmented disc plates 36, 38 and the segmented enveloping sleeve 50 shown in FIG. 7, may in other exemplary embodiments be combined with other features than illustrated in FIG. 7. For instance, according to at least some exemplary embodiments, the brake disc may comprise segmented first and second disc plates, and a non-segmented enveloping sleeve, such as the enveloping sleeves illustrated in the previously discussed drawing figures. Likewise, according to at least some exemplary embodiments, the brake disc may comprise a segmented enveloping sleeve and non-segmented first and second disc plates, such as the disc plates illustrated in the previously discussed drawing figures. The number of connecting members 64, passages 58 and holes 62 may also be different than illustrated in FIG. 7. For instance, in some exemplary embodiment there may be only one connecting member for each pair of disc plate segments.

It is to be understood that the present invention is not limited to the embodiments described above and illustrated in the drawings; rather, the skilled person will recognize that many changes and modifications may be made within the scope of the appended claims.

The invention claimed is:

1. A brake disc configured to be connected to a vehicle axle and to be squeezed between brake pads, comprising:
   a central disc body having a first side and a second side, wherein the second side faces in the opposite direction compared to the first side,
   a first disc plate and a second disc plate, each disc plate having a wear surface for producing friction when a brake pad is pressed against the wear surface,
   wherein the first and the second disc plates are releasably secured to the first side and the second side, respectively, of the central disc body, so as to enable the first and the second disc plates to be replaced by other disc plates, and
   an enveloping sleeve releasably and directly secured to an outer circumference of the central disc body so as to apply a radially inwardly directed pressure to the first and the second disc plates.

2. The brake disc of claim 1, wherein the enveloping sleeve covers the first and the second disc plates.

3. The brake disc of claim 1, wherein a width of the enveloping sleeve is greater than a width of the outer circumference of the central disc body.

4. The brake disc of claim 1, wherein the enveloping sleeve forms a circle around the outer circumference of the central disc body.

5. The brake disc of claim 1:
   wherein the brake disc has a geometrical centre axis,
   wherein the enveloping sleeve comprises a circular central portion flanked on either side by two edge portions extending from the central portion to a respective edge,
   wherein each one of the two edge portions has a mating surface for mating with an outer periphery of the first and the second disc plates, respectively, and
   wherein each one of the mating surfaces are inclined relative to the geometrical centre axis for counteracting axial movement of the first and the second disc plates relative to the central disc body.

6. The brake disc of claim 5, wherein for each one of the mating surfaces, a distance between the geometrical centre axis and the mating surface is relatively larger adjacent to the central portion of the enveloping sleeve and relatively smaller adjacent to the respective edge of the enveloping sleeve.

7. The brake disc of claim 6, wherein:
   the outer periphery extends from the wear surface to an oppositely located disc body facing surface,
   the outer periphery tapers in a direction from the disc body facing surface towards the wear surface, and
   the mating surfaces of the enveloping sleeve have a same angle of taper as the outer periphery of the first and the second disc plates, respectively.

8. The brake disc of claim 7, wherein:
   each one of the first and the second disc plates has an inner periphery extending from the wear surface to the disc body facing surface,
   the inner periphery is tapered, and
   the central disc body has a mating ledge inclined with a same angle as the taper of the inner periphery, and adapted to receive the inner periphery of the disc plate.

9. The brake disc of claim 5, wherein a thickness of each one of the edge portions of the enveloping sleeve increases from the central portion towards the respective edge.

10. The brake disc of claim 1, wherein the enveloping sleeve is secured by fastening means to the central disc body.

11. The brake disc of claim 10, wherein the fastening means comprises bolts, screws, and/or rivets.

12. The brake disc of claim 10, wherein the fastening means comprises mutually cooperating snap fit portions on the enveloping sleeve and the central disc body, respectively.

13. The brake disc of claim 1, further comprising:
   at least one connecting member for preventing rotation of the first and the second disc plates relative to the central disc body, the at least one connecting member extending from the first disc plate, through at least one passage in the central disc body, to the second disc plate,
   wherein the at least one connecting member extends into each one of the first and the second disc plates.

14. The brake disc of claim 13, wherein each one of the first and the second disc plates comprises a cavity for housing a respective end of the at least one connecting member.

15. The brake disc of claim 13, wherein the at least one passage through the central disc body has a cross-sectional area which substantially corresponds to the cross-sectional area of the at least one connecting member.

16. The brake disc of claim 13, wherein:
   the at least one connecting member is a first connecting member and the at least one passage is a first passage, and
   the brake disc further comprises at least one second connecting member extending from the first disc plate, through at least one second passage in the central disc body, to the second disc plate.

17. A vehicle comprising the brake disc of claim 1.

* * * * *